United States Patent
Lee et al.

(10) Patent No.: US 8,611,265 B2
(45) Date of Patent: Dec. 17, 2013

(54) METHODS AND SYSTEMS FOR PERFORMING HARQ ACK WITH SCANNING AND SLEEP IN WIMAX SYSTEMS

(75) Inventors: Chun Woo Lee, San Diego, CA (US); Doo Seok Kim, San Diego, CA (US); Guangming Carl Shi, San Diego, CA (US); Jong-Ro Park, San Diego, CA (US); Kyoung Cheol Oh, San Diego, CA (US); Kuo-Chun Lee, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 279 days.

(21) Appl. No.: 12/575,461

(22) Filed: Oct. 7, 2009

(65) Prior Publication Data

US 2010/0128652 A1 May 27, 2010

Related U.S. Application Data

(60) Provisional application No. 61/118,347, filed on Nov. 26, 2008, provisional application No. 61/146,062, filed on Jan. 21, 2009.

(51) Int. Cl.
*G08C 17/00* (2006.01)

(52) U.S. Cl.
USPC .......................................................... 370/311

(58) Field of Classification Search
None
See application file for complete search history.

(56) References Cited

U.S. PATENT DOCUMENTS

| 7,440,399 B2 | 10/2008 | Julian et al. | |
| 2003/0108027 A1* | 6/2003 | Kim et al. | 370/345 |
| 2004/0042492 A1* | 3/2004 | Suzuki et al. | 370/473 |
| 2005/0094561 A1* | 5/2005 | Raaf | 370/235 |
| 2005/0201325 A1* | 9/2005 | Kang et al. | 370/328 |
| 2007/0223416 A1 | 9/2007 | Baker et al. | |
| 2008/0198795 A1 | 8/2008 | Kim et al. | |
| 2009/0168920 A1 | 7/2009 | Chen | |

FOREIGN PATENT DOCUMENTS

| EP | 2124469 | 11/2009 |
| WO | WO2005109725 | 11/2005 |
| WO | WO2007084065 A2 | 7/2007 |
| WO | WO2008108228 | 9/2008 |

OTHER PUBLICATIONS

Ericsson: "DRx and VoIP," 3GPP Draft; R2-073208, 3rd Generation Partnership Project (3GPP), TSG-RAN WG2 Meeting #59, Athens, Greece; (Aug. 20, 2007), XP050135937.
International Search Report—PCT/US2009/065592—International Search Authority, European Patent Office, Mar. 29, 2010.

(Continued)

*Primary Examiner* — Anh-Vu Ly
(74) *Attorney, Agent, or Firm* — Tyler J. Overall

(57) ABSTRACT

Embodiments of the present disclosure provide techniques for processing a HARQ data burst and/or a HARQ ACK message in the event a HARQ ACK message falls within a scanning or an unavailable interval of an MS. For certain embodiments, a HARQ ACK message may be postponed if it falls within the scanning or the unavailable interval of the mobile station. For certain embodiments, the HARQ data burst transmission may be postponed if the corresponding HARQ ACK message falls within a scanning or an unavailable interval of the mobile station. For certain embodiments, the HARQ ACK may be transmitted or received even if it falls within the scanning or the unavailable interval of the mobile station. However, the HARQ ACK message may not be processed during the scanning/unavailable interval.

36 Claims, 10 Drawing Sheets

(56) References Cited

OTHER PUBLICATIONS

Research in Motion Limited: "DRX Control and NACK/ACK," 3GPP Draft TSG-RAN-WG2 Meeting #59bis; R2-073989, 3rd Generation Partnership Project (3GPP), Shanghai, China; (Oct. 8, 2007), XP050136630.

Written Opinion—PCT/US2009/065592—ISA/EPO—Mar. 29, 2010.

Taiwan Search Report—TW98140425—TIPO—Jan. 2, 2013.

* cited by examiner

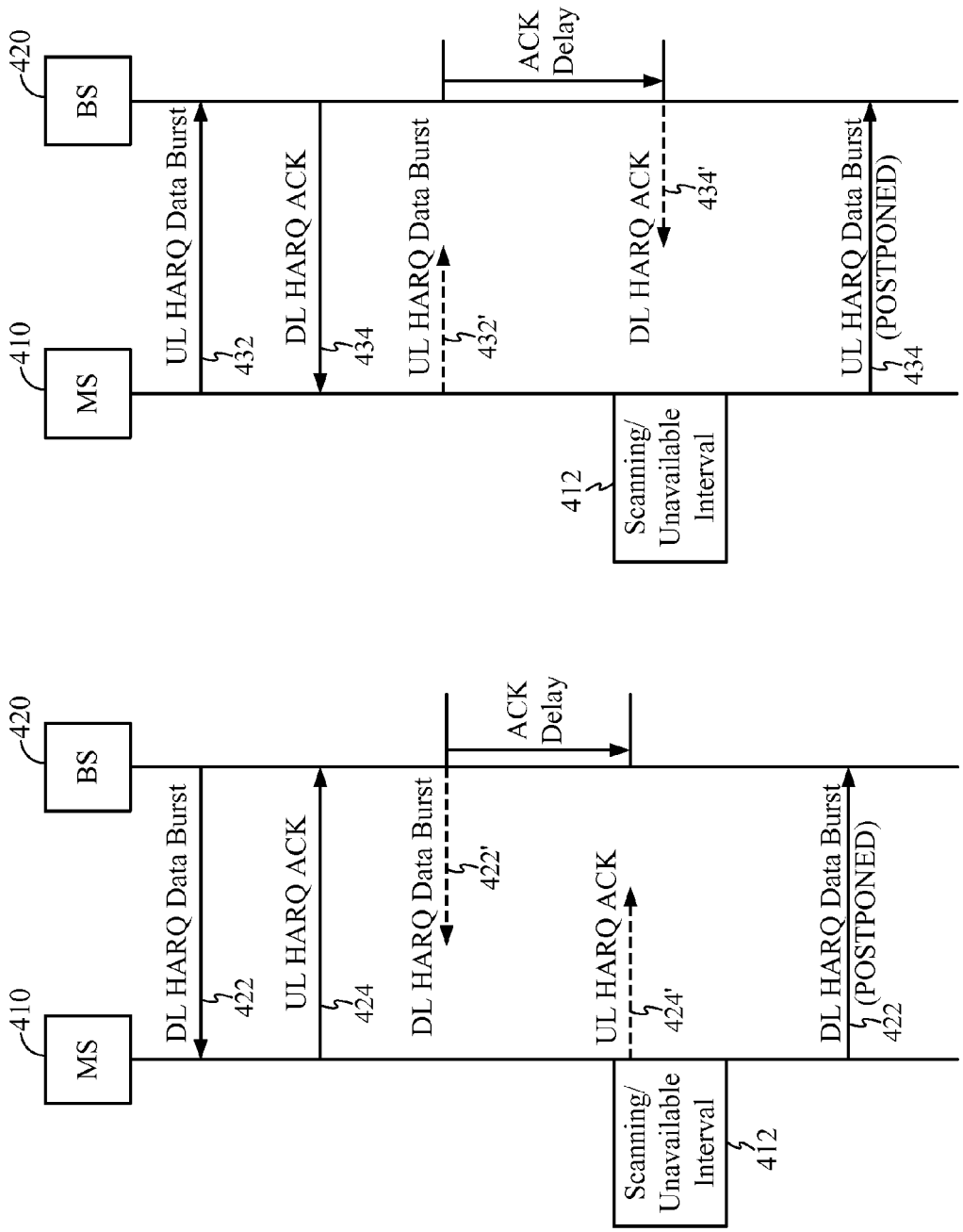

METHODS AND SYSTEMS FOR PERFORMING HARQ ACK WITH SCANNING AND SLEEP IN WIMAX SYSTEMS

CLAIM OF PRIORITY

This application claims the benefit of priority from U.S. Provisional Patent Application Ser. No. 61/118,347, entitled "Methods and Systems for Performing HARQ ACK with Scanning and Sleep in WiMAX Systems" and filed Nov. 26, 2008, and from U.S. Provisional Patent Application Ser. No. 61/146,062, entitled "HARQ ACK with Scanning and Sleep in WiMAX Systems" and filed Jan. 21, 2009, both of which are assigned to the assignee of this application and are fully incorporated herein by reference for all purposes.

TECHNICAL FIELD

Certain embodiments of the present disclosure generally relate to wireless communications and, more particularly, to Hybrid Automatic Repeat-Request (HARQ) data acknowledgements.

BACKGROUND

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX is based on OFDM (Orthogonal Frequency Division Multiplexing) and OFDMA (Orthogonal Frequency Division Multiple Access) and offers full mobility of cellular users at broadband speeds.

In the mobile WiMAX standard, a mobile station (MS) may be allocated with a scanning interval in which the MS may halt its normal operation and scan the neighboring base stations (BS). The MS may also be allocated with an unavailable interval to power down the hardware in sleep mode. During the scanning interval or the unavailable interval, a BS may neither transmit to the MS nor expect to receive any messages from the MS.

A Hybrid Automatic Repeat-Request (HARQ)-enabled MS transmits uplink (UL) HARQ data bursts and receives downlink (DL) Acknowledgements (ACKs) from the BS. Similarly, the HARQ-enabled MS receives DL HARQ data bursts and transmits UL ACKs to the BS. In the WiMAX standard, the delay for the BS to send the DL HARQ ACK after receiving a UL HARQ data burst may be constant and may be given in a downlink channel descriptor (DCD) message. Similarly, the delay for the BS to receive a UL HARQ ACK message after transmitting a DL HARQ data burst may be constant and may be configured in an uplink channel descriptor (UCD) message. For example, both DL ACK and UL ACK delays may be set to 1, 2 or 3 frames after data burst transmission.

If a HARQ data burst is sent right before the start of a scanning interval or an unavailable interval of an MS, a corresponding HARQ ACK message may not be transmitted or received properly if it falls in the middle of the scanning interval or the unavailable interval. This may result in unnecessary retransmissions of data that was successfully received.

SUMMARY

Certain aspects provide a method for wireless communications. The method generally includes receiving a HARQ data burst, determining if a corresponding HARQ Acknowledgement (HARQ ACK) message for the HARQ data burst will occur in a scanning or an unavailable interval of a mobile station (MS), and if so, postponing transmission of the HARQ ACK message until after the scanning or the unavailable interval.

Certain aspects provide a method for wireless communications. The method generally includes monitoring a scanning or an unavailable interval of a mobile station (MS), determining if a HARQ Acknowledgement (HARQ ACK) message for a HARQ data burst to be allocated will occur in the scanning or an unavailable interval of the MS, and if so, postponing allocation of the HARQ data burst until after the scanning or the unavailable interval.

Certain aspects provide a method for wireless communications. The method generally includes receiving a HARQ data burst, determining if a corresponding HARQ Acknowledgement (HARQ ACK) message for the HARQ data burst will occur in a scanning or an unavailable interval of a mobile station, and if so, transmitting the HARQ ACK message during the scanning or the unavailable interval.

Certain aspects provide an apparatus for wireless communications. The apparatus generally includes means for receiving a HARQ data burst, means for determining if a corresponding HARQ Acknowledgement (HARQ ACK) message for the HARQ data burst will occur in a scanning or an unavailable interval of a mobile station (MS) and means for postponing transmission of the HARQ ACK message until after the scanning or the unavailable interval.

Certain aspects provide an apparatus for wireless communications. The apparatus generally includes means for monitoring a scanning or an unavailable interval of a mobile station (MS), means for determining if a HARQ Acknowledgement (HARQ ACK) message for a HARQ data burst to be allocated will occur in the scanning or an unavailable interval of the MS, and means for postponing allocation of the HARQ data burst until after the scanning or the unavailable interval.

Certain aspects provide an apparatus for wireless communications. The apparatus generally includes means for receiving a HARQ data burst, means for determining if a corresponding HARQ Acknowledgement (HARQ ACK) message for the HARQ data burst will occur in a scanning or an unavailable interval of a mobile station and means for transmitting the HARQ ACK message during the scanning or the unavailable interval.

Certain aspects provide an apparatus for wireless communications. The apparatus generally includes logic for receiving a HARQ data burst, logic for determining if a corresponding HARQ Acknowledgement (HARQ ACK) message for the HARQ data burst will occur in a scanning or an unavailable interval of a mobile station (MS) and logic for postponing transmission of the HARQ ACK message until after the scanning or the unavailable interval.

Certain aspects provide an apparatus for wireless communications. The apparatus generally includes logic for monitoring a scanning or an unavailable interval of a mobile station (MS), logic for determining if a HARQ Acknowledgement (HARQ ACK) message for a HARQ data burst to be allocated will occur in the scanning or an unavailable interval of the MS, and logic for postponing allocation of the HARQ data burst until after the scanning or the unavailable interval.

Certain aspects provide an apparatus for wireless communications. The apparatus generally includes logic for receiving a HARQ data burst, logic for determining if a corresponding HARQ Acknowledgement (HARQ ACK) message for the HARQ data burst will occur in a scanning or an unavailable interval of a mobile station and logic for transmitting the HARQ ACK message during the scanning or the unavailable interval.

Certain aspects of the present disclosure provide a computer-program product for wireless communications, comprising a computer readable medium having instructions stored thereon, the instructions being executable by one or more processors. The instructions generally include instructions for receiving a HARQ data burst, instructions for determining if a corresponding HARQ Acknowledgement (HARQ ACK) message for the HARQ data burst will occur in a scanning or an unavailable interval of a mobile station (MS), and instructions for postponing transmission of the HARQ ACK message until after the scanning or the unavailable interval.

Certain aspects of the present disclosure provide a computer-program product for wireless communications, comprising a computer readable medium having instructions stored thereon, the instructions being executable by one or more processors. The instructions generally include instructions for monitoring a scanning or an unavailable interval of a mobile station (MS), instructions for determining if a HARQ Acknowledgement (HARQ ACK) message for a HARQ data burst to be allocated will occur in the scanning or an unavailable interval of the MS, and instructions for postponing allocation of the HARQ data burst until after the scanning or the unavailable interval.

Certain aspects of the present disclosure provide a computer-program product for wireless communications, comprising a computer readable medium having instructions stored thereon, the instructions being executable by one or more processors. The instructions generally include instructions for receiving a HARQ data burst, instructions for determining if a corresponding HARQ Acknowledgement (HARQ ACK) message for the HARQ data burst will occur in a scanning or an unavailable interval of a mobile station and instructions for transmitting the HARQ ACK message during the scanning or the unavailable interval.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

FIGS. 8A and 8B illustrate example scenarios for uplink and downlink, respectively, in which HARQ data burst allocations are postponed if the corresponding HARQ ACK messages fall within scanning or unavailable intervals of an MS, in accordance with certain embodiments of the present disclosure.

DETAILED DESCRIPTION

The techniques described herein may be used for various broadband wireless communication systems, including communication systems that are based on an orthogonal multiplexing scheme. Examples of such communication systems include Orthogonal Frequency Division Multiple Access (OFDMA) systems, Single-Carrier Frequency Division Multiple Access (SC-FDMA) systems, and so forth. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

WiMAX is one example of a communication system based on an orthogonal multiplexing scheme. As noted above, there are two main applications of WiMAX today: fixed WiMAX and mobile WiMAX. Fixed WiMAX applications are point-to-multipoint, enabling broadband access to homes and businesses, for example. Mobile WiMAX is based on OFDM and OFDMA and offers the full mobility of cellular networks at broadband speeds.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

Exemplary Wireless Communication System

Figure 1:
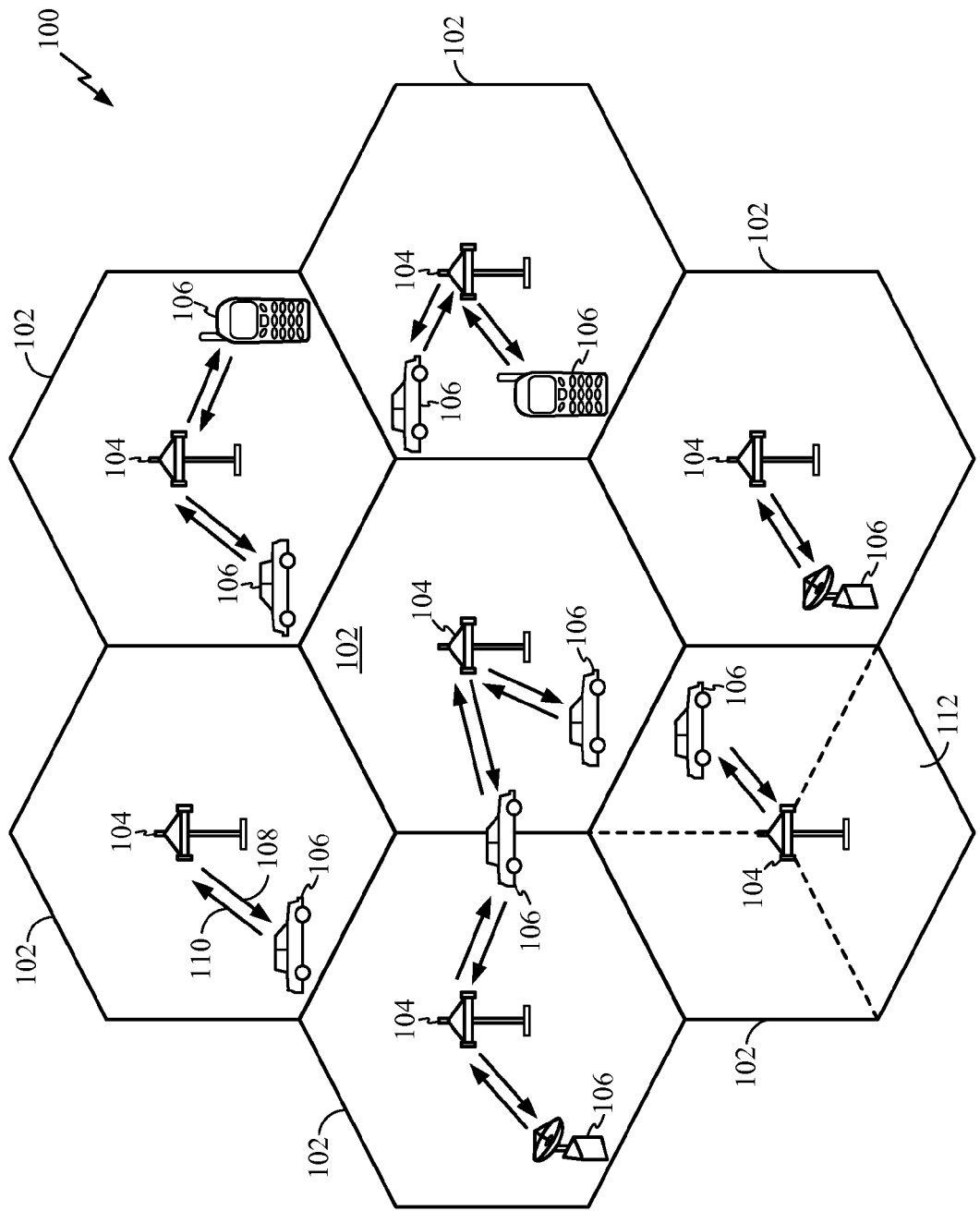
FIG. 1 illustrates an example wireless communication system, in accordance with certain embodiments of the present disclosure.

FIG. 1 illustrates an example of a wireless communication system 100 in which embodiments of the present disclosure may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
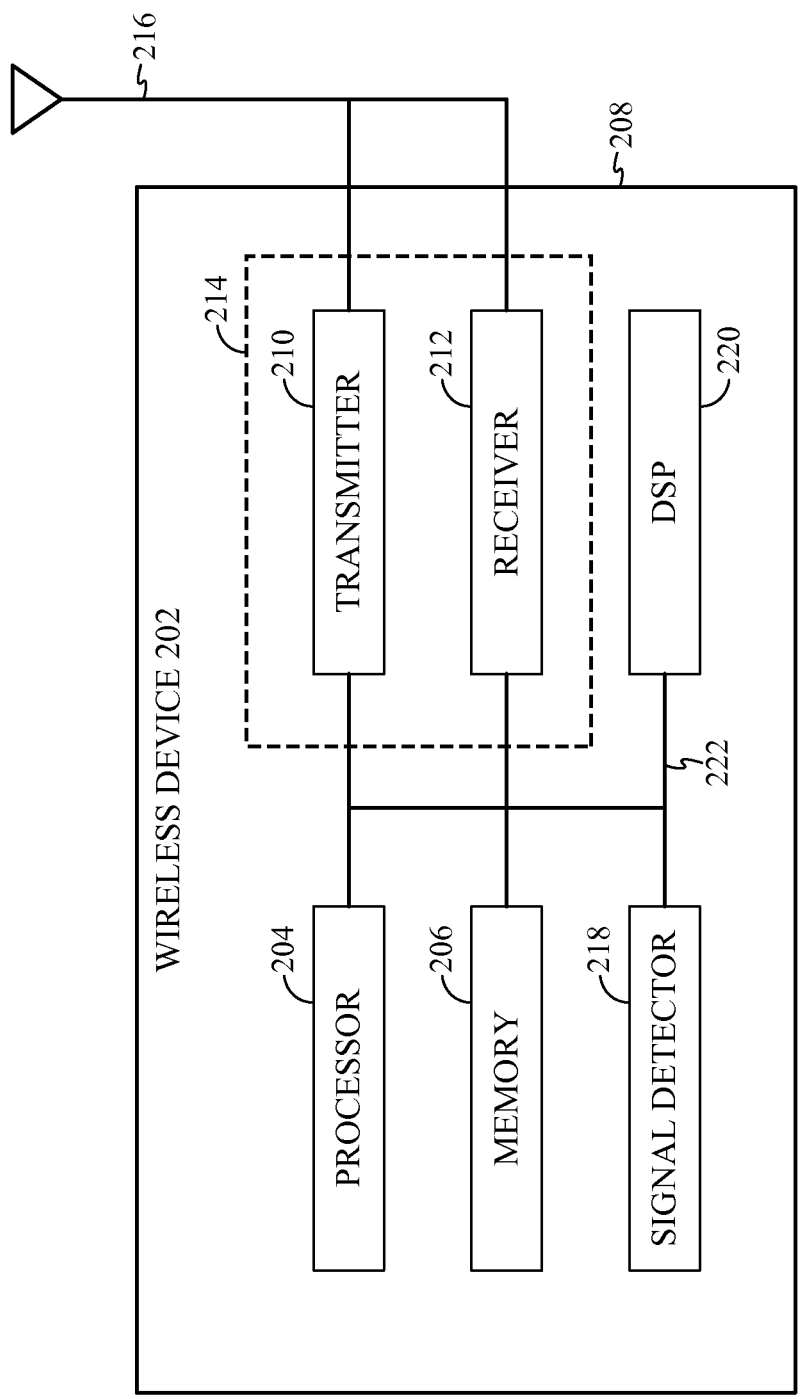
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, energy per subcarrier per symbol, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
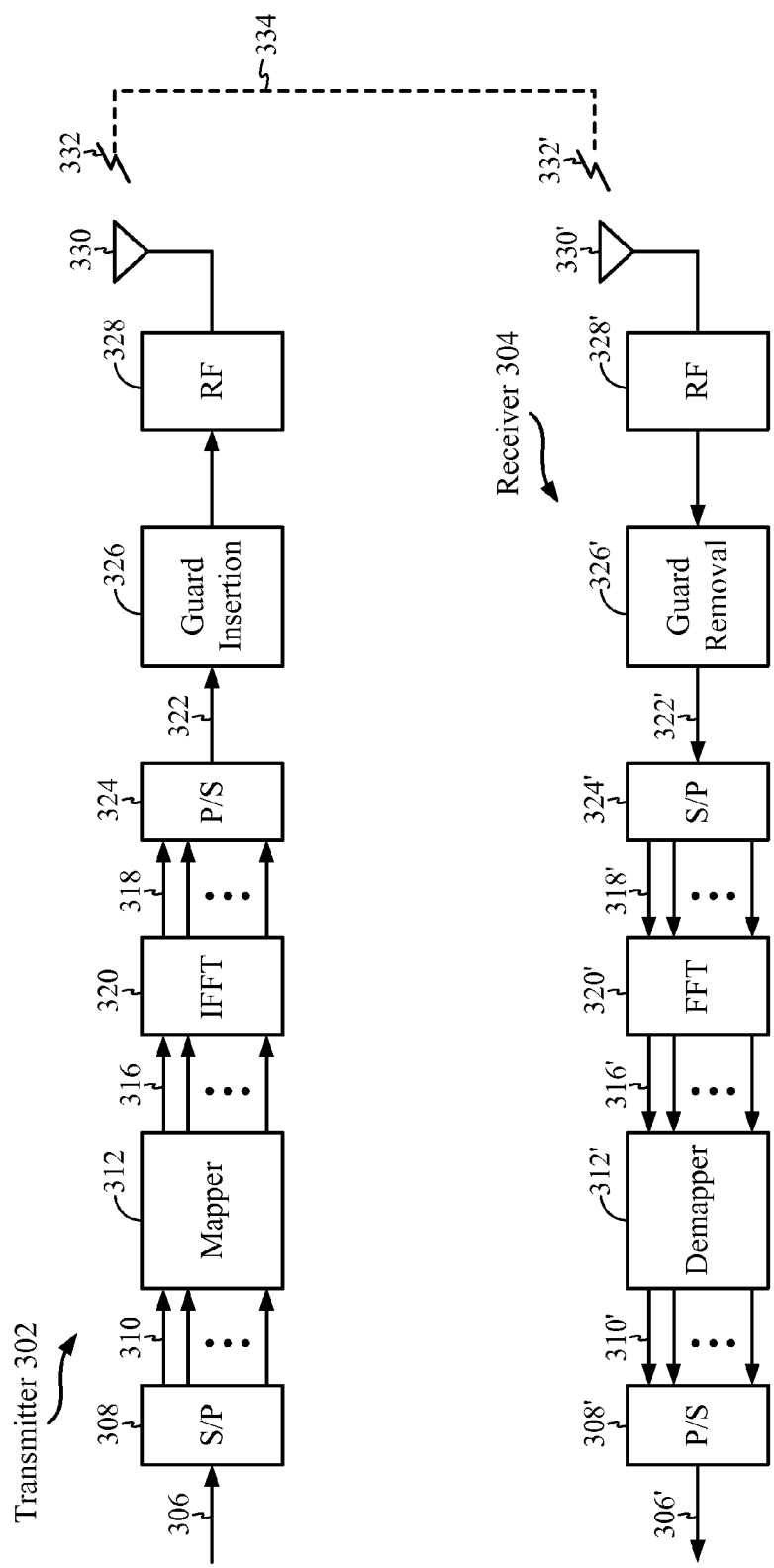
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel 334. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary HARQ ACK with Scanning and Sleep in WiMAX

In the mobile WiMAX standard, a mobile station (MS) may be allocated with a scanning interval in which the MS may halt its normal operation to scan the neighboring base stations (BS). The MS may also be allocated with an unavailable interval to power down its hardware in sleep mode. During the scanning interval or the unavailable interval, the BS may not exchange messages with the MS.

A Hybrid Automatic Repeat Request (HARQ)-enabled MS may transmit uplink (UL) HARQ data bursts and receive acknowledgement messages (ACKs) from a BS. The acknowledgement message can indicate whether or not the HARQ data burst transmission is successful or a failure. In the WiMAX standard, the delay for an MS or a BS to send a HARQ ACK after receiving a HARQ data burst (e.g., downlink HARQ data burst and uplink HARQ data burst, respectively) may be constant and may be given in a downlink channel descriptor (DCD) or an uplink channel descriptor (UCD) message for downlink or uplink messages, respectively.

If a HARQ data burst is sent right before the start of a scanning or an unavailable interval of an MS, a corresponding HARQ ACK message may not be transmitted or received properly if it falls in the middle of the scanning or the unavailable interval. This may result in unnecessary retransmissions of data that have already been successfully received.

Certain embodiments of the present disclosure provide techniques in which a HARQ ACK message and/or HARQ data burst allocation may be postponed if a HARQ ACK message would otherwise fall within a scanning or an unavailable interval of an MS. For certain embodiments, the MS may continue to transmit/receive HARQ ACK messages even if those messages fall within the scanning/unavailable interval of the MS. However, the MS may not process the received HARQ ACK messages during the scanning/unavailable interval.

Figures 4A, 4B:
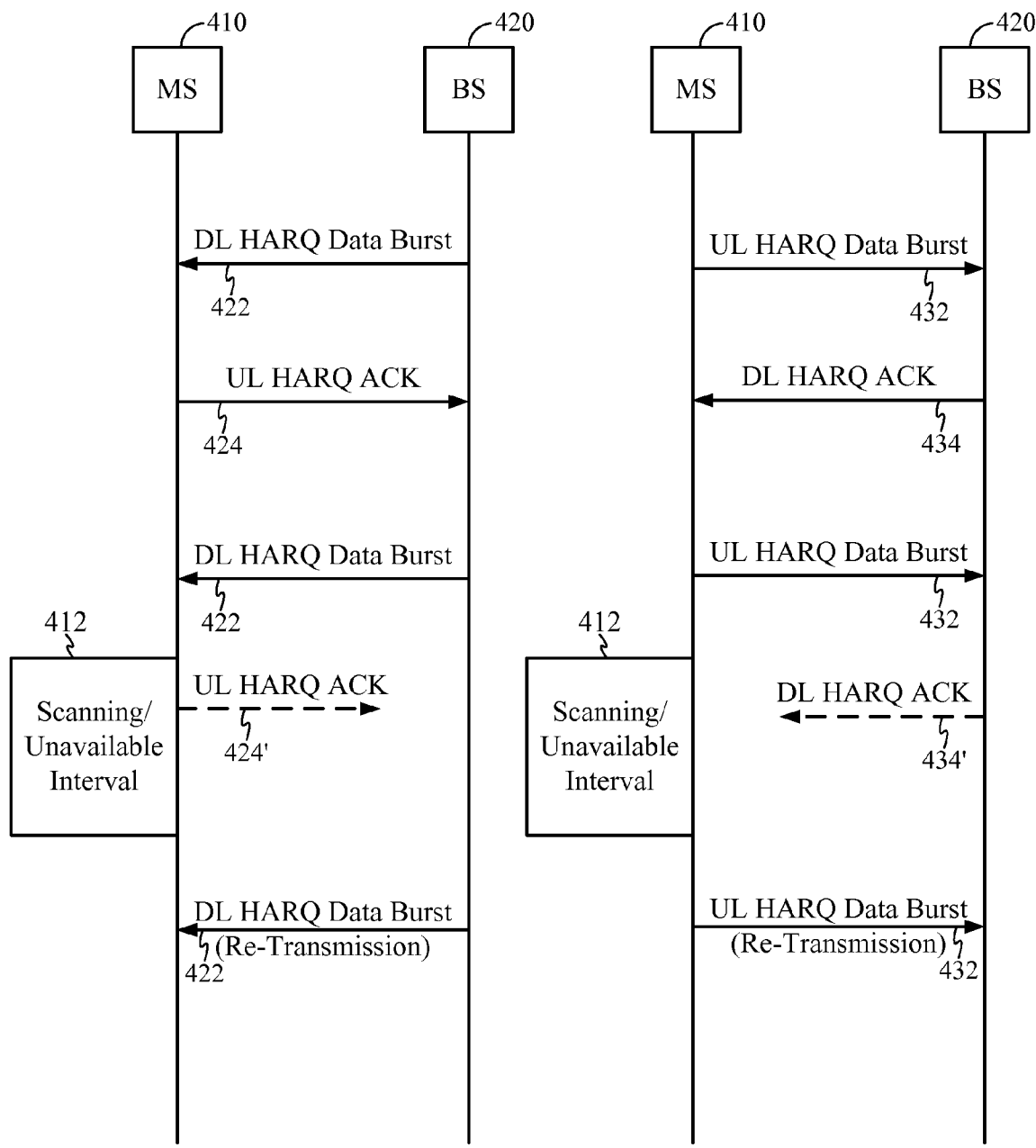
FIGS. 4A and 4B illustrate example scenarios for downlink and uplink, respectively, in which hybrid automatic repeat request acknowledgement (HARQ ACK) messages fall within scanning or unavailable intervals of a mobile station.

FIGS. 4A and 4B illustrate example HARQ data burst and ACK message exchanges between an MS 410 and a BS 420 for downlink and uplink, respectively, in compliance with the mobile WiMAX standard.

In FIG. 4A, a downlink (DL) HARQ data burst 422 is transmitted from the BS to the MS. Within the specified delay time, the MS acknowledges the reception of the DL HARQ data burst 422 by transmitting an uplink (UL) HARQ acknowledgement (ACK) message 424 to the BS. As illustrated, however, if a DL HARQ data burst 422 is transmitted right before a scanning/unavailable interval 412, the MS may not be available to transmit a UL HARQ ACK message 424'. The scanning/unavailable interval generally refers to any period that the MS is unavailable, such as a scanning interval or unavailable window of a sleep mode. As a result, the BS may unnecessarily retransmit the DL HARQ data burst 422 even if it was successfully received by the MS.

In FIG. 4B, a UL HARQ data burst 432 is transmitted from the MS to the BS. Within a pre-specified delay time, the BS acknowledges the reception of the UL HARQ data burst 432 by transmitting a DL HARQ ACK message 434 to the MS. As illustrated, however, if a UL HARQ data burst 432 is transmitted right before the scanning/unavailable interval 412, the MS may not be available to receive a DL HARQ ACK message 434'. As a result, the MS may unnecessarily retransmit the UL HARQ data burst 432 after the scanning/unavailable interval is completed, even if the data burst was successfully received by the BS.

Figure 5:
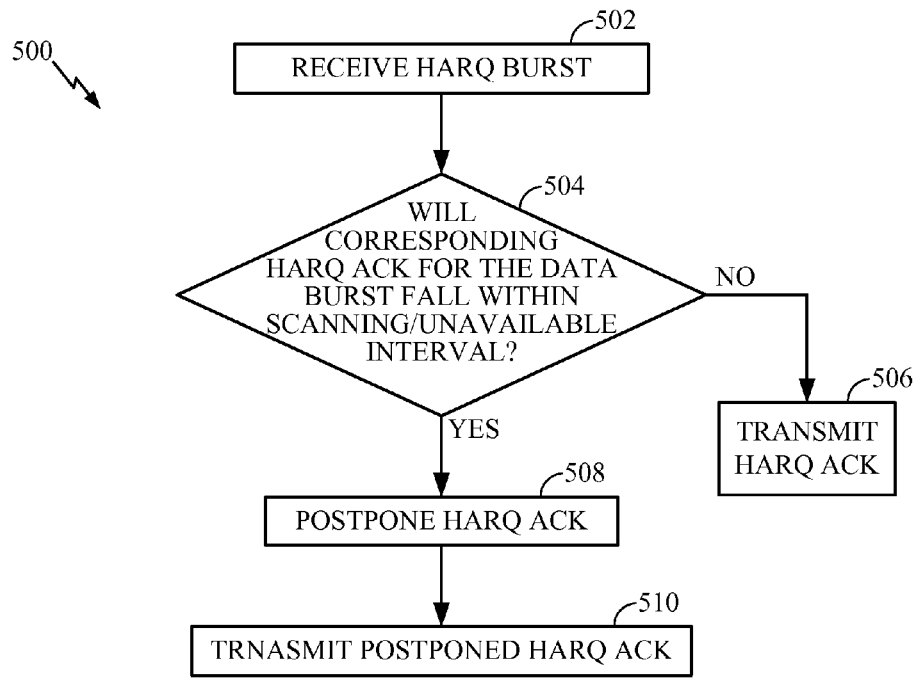
FIG. 5 illustrates example operations for postponing a HARQ ACK message if a HARQ ACK message falls within a scanning or an unavailable interval of a mobile station, in accordance with certain embodiments of the present disclosure.

Certain embodiments of the present disclosure, however, may allow for efficient HARQ transmissions while a device is scanning or is unavailable. For example, FIG. 5 illustrates example operations 500 that may be performed to postpone a HARQ ACK message, in the event that the HARQ ACK message falls within a scanning/unavailable interval of an MS.

At 502, a HARQ data burst is received. At 504, if a corresponding HARQ ACK message for the data burst does not occur within a scanning or an unavailable interval, at 506, the HARQ ACK message is transmitted normally without any extra delay.

On the other hand, at 508, if the HARQ ACK message falls within the scanning/unavailable interval of the MS, the HARQ ACK message is postponed. The MS may postpone transmission of the HARQ ACK message by adding a length of the scanning or the unavailable interval, in frames, to a HARQ ACK delay period.

At 510, a postponed HARQ ACK message is transmitted after the scanning or the unavailable interval is finished.

Figures 6A, 6B:
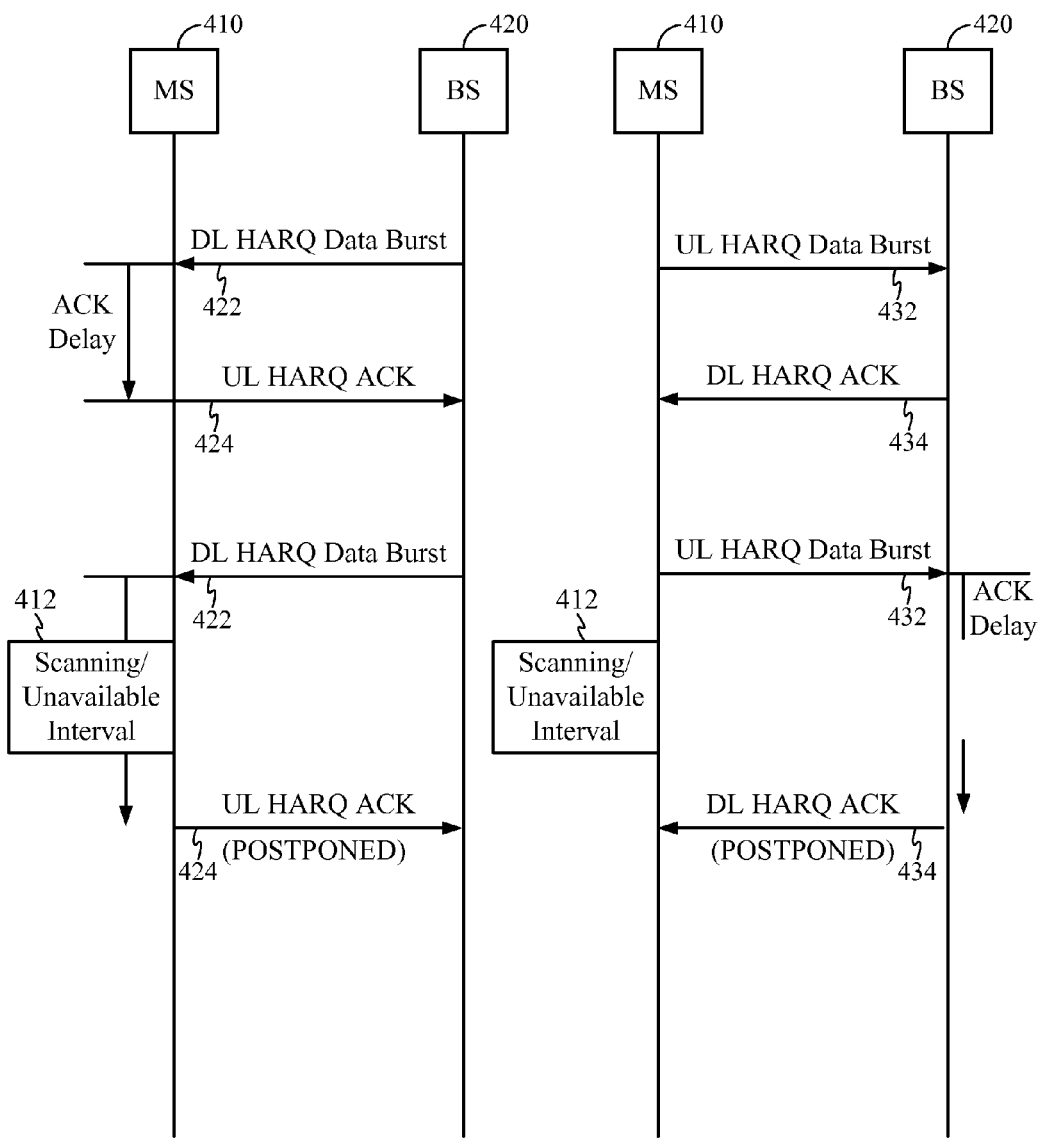
FIGS. 6A and 6B illustrate example scenarios for downlink and uplink, respectively, in which a HARQ ACK message is postponed if the HARQ ACK message falls within a scanning or an unavailable interval of an MS, in accordance with certain embodiments of the present disclosure.

FIGS. 6A and 6B illustrate example scenarios for downlink and uplink, respectively, in which HARQ ACK messages are postponed if the HARQ ACK messages fall within scanning or unavailable intervals of a mobile station, in accordance with certain embodiments of the present disclosure.

As illustrated in FIG. 6A, if an MS receives a DL HARQ data burst 422 right before the scanning/unavailable interval 412, the MS may postpone transmitting the UL HARQ ACK message 424 until after the scanning/unavailable interval 412. The UL HARQ ACK message 424 may be postponed, for example, by the number of frames in the scanning/unavailable interval. For certain embodiments, the BS may be configured to monitor the scanning/unavailable interval of the MS and adjust the time it is expecting to receive the UL HARQ ACK message 424 before re-transmitting the DL HARQ data burst 422.

As illustrated in FIG. 6B, if a BS receives a UL HARQ data burst 432 right before the scanning/unavailable interval 412, the BS may postpone transmitting the DL HARQ ACK message 434 until after the scanning/unavailable interval 412 is finished. The DL HARQ ACK message 434 may be postponed, for example, by the number of frames in the scanning/unavailable interval. For certain embodiments, the MS may be configured to adjust the time it is expecting to receive the DL HARQ ACK message 434 before re-transmitting the UL HARQ data burst 432.

Certain embodiments of the present disclosure propose efficient HARQ transmissions while a device is scanning or in a sleep mode by postponing HARQ data burst allocations.

Figure 7:
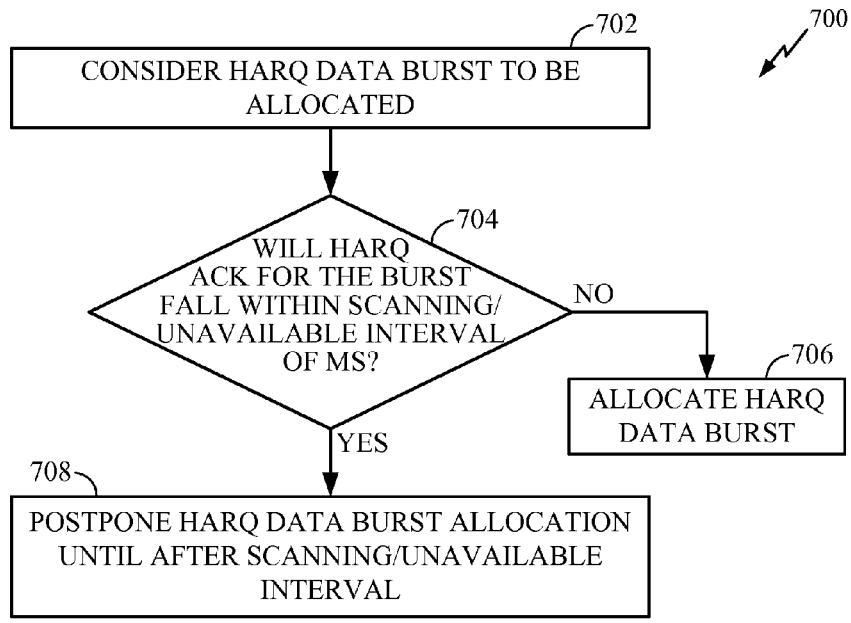
FIG. 7 illustrates example operations for postponing allocation of a HARQ data burst, if a corresponding HARQ ACK message falls within a scanning or an unavailable interval of a mobile station, in accordance with certain embodiments of the present disclosure.

FIG. 7 illustrates example operations 700 that may be performed by a BS to postpone allocation of a HARQ data burst, in the event a HARQ ACK message corresponding to the HARQ data burst falls within a scanning/unavailable interval of an MS.

At 702, resources are being allocated to a HARQ data burst in either downlink or uplink. The scanning/unavailable interval of the MS may be monitored to determine if the corresponding HARQ ACK message for the data burst will likely fall therein. If it is determined, at 704, that the corresponding HARQ ACK message for the data burst will not fall within a scanning/unavailable interval, the data burst is normally allocated without any delay, at 706.

On the other hand, if it is determined that the HARQ ACK message will fall within the scanning/unavailable interval of the MS, allocation of the HARQ data burst is postponed, at 708, until after the scanning/unavailable interval is finished. The allocation of the HARQ data burst may be postponed based on a start frame of the scanning or the unavailable interval and a HARQ ACK delay period.

FIGS. 8A and 8B illustrate example scenarios for uplink and downlink in which HARQ data burst allocations are postponed if the corresponding HARQ ACK massages fall within the scanning/unavailable interval, in accordance with certain embodiments of the present disclosure.

As illustrated in FIG. 8A, if the BS determines that a DL HARQ data burst 422' to be allocated before the scanning/unavailable interval 412 would result in the corresponding UL HARQ ACK message 424' to fall within the scanning/unavailable interval 412, the BS may postpone allocation and transmission of the DL HARQ data burst until after the scanning/unavailable interval 412 is finished.

As illustrated in FIG. 8B, if the BS determines that a UL HARQ data burst 432' to be allocated before the scanning/unavailable interval 412 would result in the corresponding DL HARQ ACK message 434' to fall within the scanning/unavailable interval 412, the BS may postpone allocation and hence reception of the UL HARQ data burst until after the scanning/unavailable interval 412 is finished.

The BS may postpone the allocation based on the frame numbers in which the scanning/unavailable interval starts, and number of frames between transmission of a HARQ data burst and reception of an ACK message to ensure the HARQ ACK messages do not fall within a scanning interval.

For certain embodiments, if the scanning/unavailable interval starts at frame N for an MS and the delay for HARQ ACK is d frames, the BS may decide not to allocate data burst on frames N−3, N−2, and N−1 if d=3. Accordingly, the BS may not allocate any data burst on frames N−2, and N−1 if d=2, and on frame N−1 if d=1.

The techniques presented herein may avoid unnecessary retransmissions caused by a failure to receive HARQ ACK messages during a scanning/unavailable interval of the MS, even when the data bursts are successfully received, by postponing HARQ ACK messages and/or by postponing HARQ data burst allocations.

For certain embodiments of the present disclosure, an MS may still receive only the last HARQ ACK message from a BS or may transmit the last HARQ ACK message to the BS during a scanning or an unavailable interval.

Figure 9:
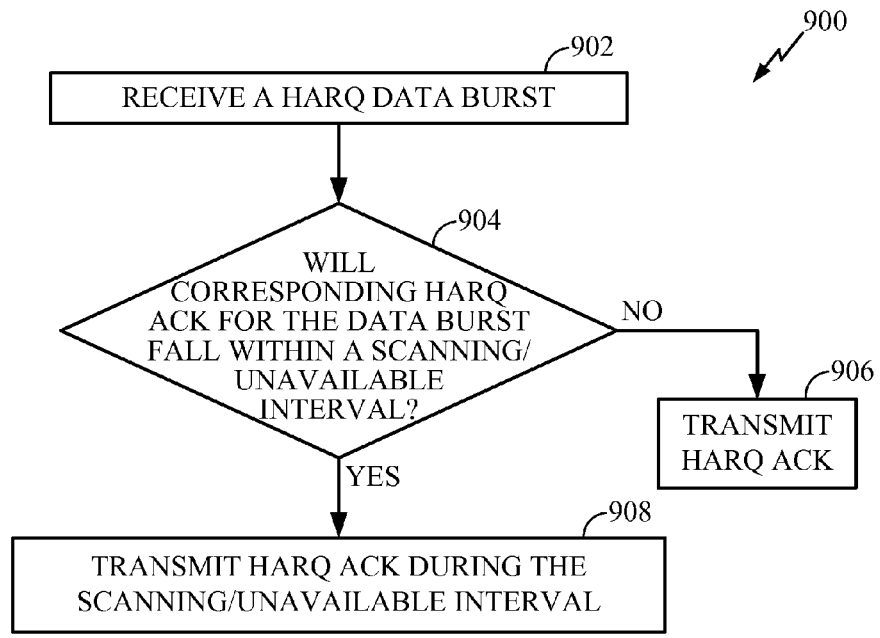
FIG. 9 illustrates example operations for transmitting or receiving a HARQ ACK message during a scanning/unavailable interval of a mobile station, in accordance with certain embodiments of the present disclosure.

FIG. 9 illustrates example operations 900 that may be performed to transmit or receive the last HARQ ACK message, in the event that the HARQ ACK message falls within a scanning/unavailable interval of an MS.

At 902, a HARQ data burst is received by either an MS or a BS. If it is determined, at 904, that a corresponding HARQ ACK message for the data burst will not fall within a scanning/unavailable interval, the HARQ ACK message may be transmitted normally with a standard delay at 906. The HARQ ACK message may either be an uplink HARQ ACK message transmitted by the MS or a downlink HARQ ACK message transmitted by the BS.

Yet, if it is determined that the HARQ ACK message will fall within the scanning/unavailable interval, the HARQ ACK message may still be sent at 908. The HARQ ACK message may still be sent because an MS may still receive or transmit the last HARQ ACK message from or to the BS during the scanning interval or the unavailable interval. However, the MS and the BS may not transmit any MAC protocol data units (MPDUs), nor may the MS provide feedback on a channel quality indicator channel (CQICH) during the scanning interval or the unavailable interval.

Figure 10B:
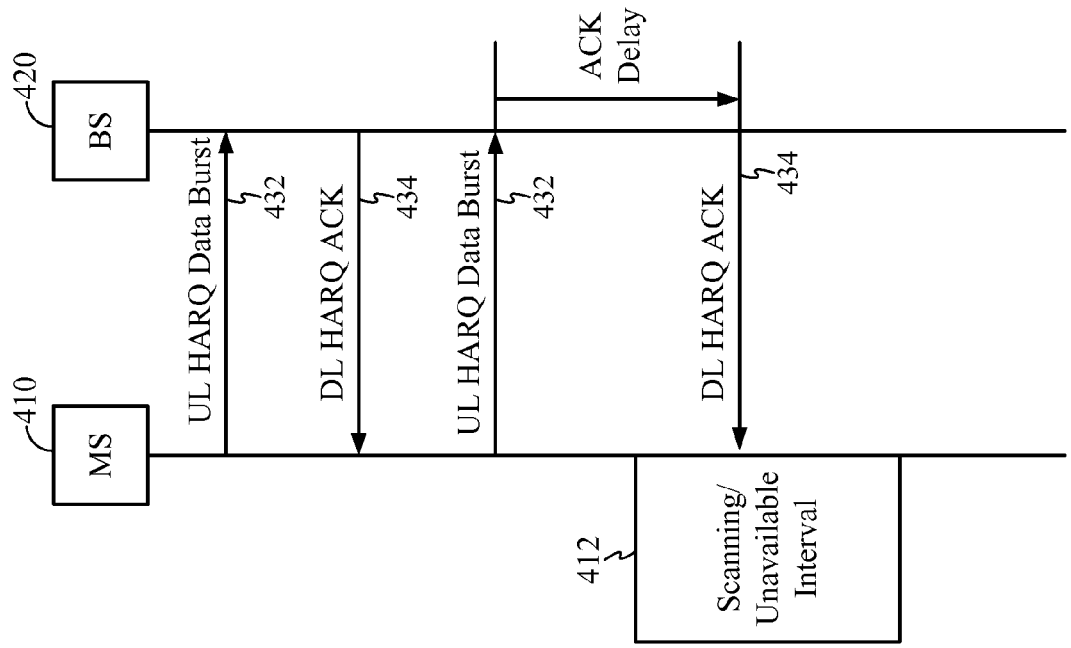
FIGS. 10A and 10B illustrate the transmission and reception of a HARQ ACK message during a scanning/unavailable interval of a mobile station, in accordance with certain embodiments of the present disclosure.
Figure 10A:
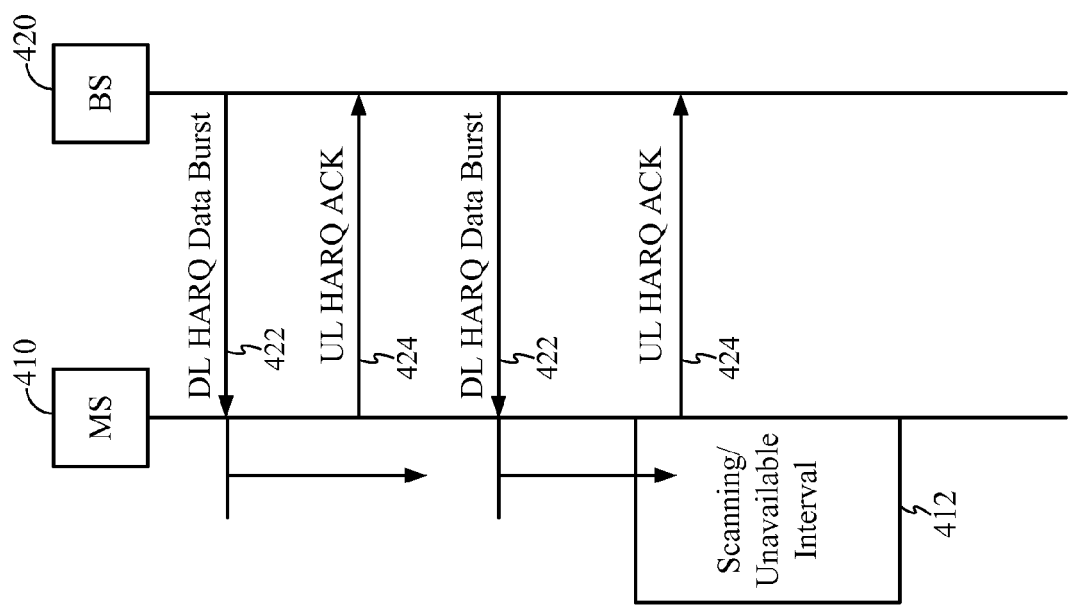

FIGS. 10A and 10B illustrate transmission and reception of a HARQ ACK message during a scanning/unavailable interval of a mobile station, in accordance with certain embodiments of the present disclosure.

As illustrated in FIG. 10A, if an MS 410 receives a DL HARQ data burst 422 right before the scanning/unavailable interval 412, the MS may still transmit the last HARQ ACK message 424 to the BS 420 during the scanning/unavailable interval 412. The MS may scan one or more neighboring base stations during the frame immediately subsequent to a frame in which the HARQ ACK message 424 was transmitted.

As illustrated in FIG. 10B, if a BS 420 receives a UL HARQ data burst 432 right before the scanning/unavailable interval 412, the BS 420 may still transmit the last HARQ ACK 434 to the MS 410 during the scanning/unavailable interval 412.

For certain embodiments of the present disclosure, to enhance the performance of the sleep/unavailable mode, the MS 410 may maintain at least a portion of the radio frequency (RF) circuit of the receive chain powered on while shutting down the other elements of the receive chain, such as software and firmware. For example, if the MS 410 sends a HARQ data burst 432 prior to a scanning/unavailable interval 412, the MS 410 may anticipate receiving a HARQ ACK message 434 during the subsequent scanning/unavailable interval 412. Consequently, the MS 410 may leave a portion of the RF circuit of the receive chain powered on during at least part of the scanning/unavailable interval 412.

If the MS 410 receives a DL sub-frame containing the HARQ ACK message 434 during the unavailable interval 412, the MS 410 may store a plurality of I-Q samples of the DL sub-frame which may contain the DL HARQ ACK message 434. Then, after waking up during or shortly before the available interval, the MS 410 may process and decode the plurality of stored of I-Q samples. This may allow the MS 410 to save more power during the unavailable interval.

Figure 5A:
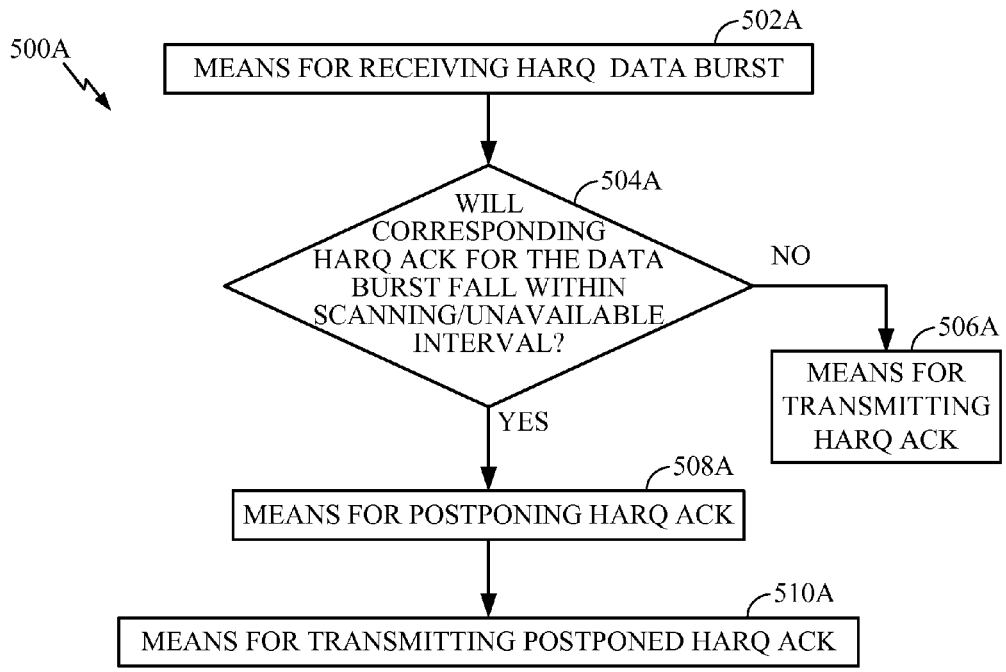
FIG. 5A is a block diagram of means corresponding to the example operations of FIG. 5.
Figure 7A:
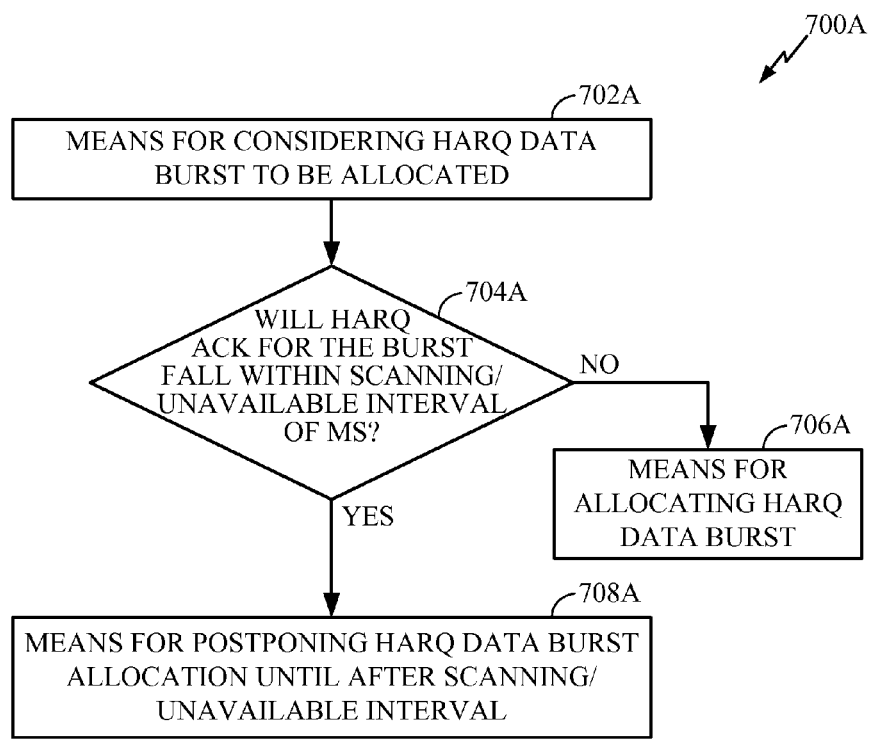
FIG. 7A is a block diagram of means corresponding to the example operations of FIG. 7.
Figure 9A:
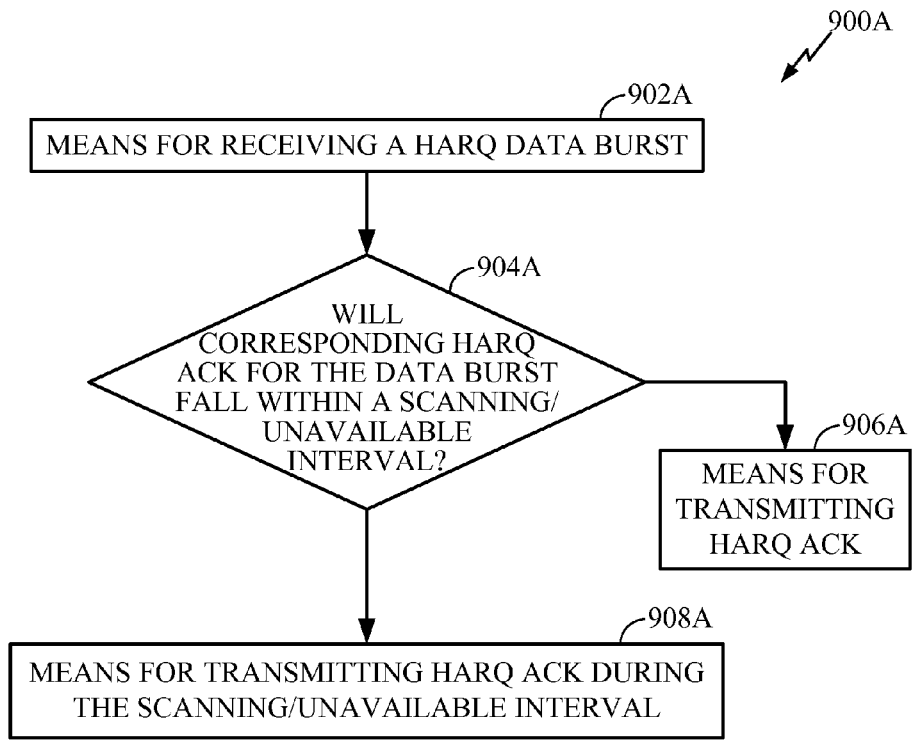
FIG. 9A is a block diagram of means corresponding to the example operations of FIG. 9.

The various operations of methods described above may be performed by various hardware and/or software component(s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 500 illustrated in FIG. 5 correspond to means-plus-function blocks 500A illustrated in FIG. 5A. Similarly, operations 700 illustrated in FIG. 7 correspond to means-plus-function blocks 700A illustrated in FIG. 7A, while operations 900 illustrated in FIG. 9 correspond to means-plus-function blocks 900A illustrated in FIG. 9A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

Information and signals may be represented using any of a variety of different technologies and techniques. For example, data, instructions, commands, information, signals, and the like, that may be referenced throughout the above description may be represented by voltages, currents, electromagnetic waves, magnetic fields or particles, optical fields or particles or any combination thereof.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic devices, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated in the Figures, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims While the foregoing is directed to embodiments of the present disclosure, other and further embodiments of the disclosure may be devised without departing from the basic scope thereof, and the scope thereof is determined by the claims that follow.

What is claimed is:

1. A method for wireless communications, comprising:
   monitoring a scanning or an unavailable interval of a mobile station (MS);
   determining if a hybrid automatic repeat request acknowledgement (HARQ ACK) message for a HARQ data burst will occur in the scanning or the unavailable interval of the MS; and
   if so, postponing retransmission of the HARQ data burst by adjusting a time expected to receive the HARQ ACK message until after the scanning or the unavailable interval.

2. The method of claim 1, wherein the HARQ data burst comprises an uplink (UL) HARQ data burst.

3. The method of claim 1, wherein the HARQ data burst comprises a downlink (DL) HARQ data burst.

4. A method for wireless communications, comprising:
receiving a hybrid automatic repeat request (HARQ) data burst;
determining if a corresponding HARQ Acknowledgement (HARQ ACK) message for the HARQ data burst will occur in a scanning or an unavailable interval of a mobile station;
if so, transmitting the HARQ ACK message during the scanning or the unavailable interval; and
storing a plurality of I-Q samples from a DL sub-frame containing the HARQ ACK message during the unavailable interval.

5. The method of claim 4, wherein:
receiving the HARQ data burst comprises receiving an uplink (UL) data burst; and
transmitting the HARQ ACK message comprises transmitting a downlink (DL) HARQ ACK message.

6. The method of claim 4, wherein:
receiving the HARQ data burst comprises receiving a downlink (DL) data burst; and
transmitting the HARQ ACK message comprises transmitting an uplink (UL) HARQ ACK message.

7. The method of claim 4, further comprising:
scanning one or more neighboring base stations by the mobile station during a frame immediately subsequent to a frame in which the HARQ ACK message was transmitted.

8. The method of claim 4, further comprising:
maintaining at least a portion of a radio frequency (RF) circuit powered on during at least part of the unavailable interval.

9. A method for wireless communications, comprising:
receiving a hybrid automatic repeat request (HARQ) data burst;
determining if a corresponding HARQ Acknowledgement (HARQ ACK) message for the HARQ data burst will occur in a scanning or an unavailable interval of a mobile station;
if so, transmitting the HARQ ACK message during the scanning or the unavailable interval;
receiving a DL sub-frame containing the HARQ ACK message during the unavailable interval; and
processing the DL sub-frame after waking up from the unavailable interval.

10. An apparatus for wireless communications, comprising:
means for monitoring a scanning or an unavailable interval of a mobile station (MS);
means for determining if a hybrid automatic repeat request Acknowledgement (HARQ ACK) message for a HARQ data burst will occur in the scanning or an unavailable interval of the MS; and
means for postponing retransmission of the HARQ data burst by adjusting a time expected to receive the HARQ ACK message until after the scanning or the unavailable interval.

11. The apparatus of claim 10, wherein the HARQ data burst comprises an uplink (UL) HARQ data burst.

12. The apparatus of claim 10, wherein the HARQ data burst comprises a downlink (DL) HARQ data burst.

13. An apparatus for wireless communications, comprising:
means for receiving a hybrid automatic repeat request (HARQ) data burst;
means for determining if a corresponding HARQ Acknowledgement (HARQ ACK) message for the HARQ data burst will occur in a scanning or an unavailable interval of a mobile station;
means for transmitting the HARQ ACK message during the scanning or the unavailable interval; and
means for storing a plurality of I-Q samples from a DL sub-frame containing the HARQ ACK message during the unavailable interval.

14. The apparatus of claim 13, wherein:
the means for receiving the HARQ data burst comprises means for receiving an uplink (UL) data burst; and
the means for transmitting the HARQ ACK message comprises means for transmitting a downlink (DL) HARQ ACK message.

15. The apparatus of claim 13, wherein:
the means for receiving the HARQ data burst comprises means for receiving a downlink (DL) data burst; and
the means for transmitting the HARQ ACK message comprises means for transmitting an uplink (UL) HARQ ACK message.

16. The apparatus of claim 13, further comprising:
means for scanning one or more neighboring base stations by the mobile station during a frame immediately subsequent to a frame in which the HARQ ACK message was transmitted.

17. The apparatus of claim 13, further comprising:
means for maintaining at least a portion of a radio frequency (RF) circuit powered on during at least part of the unavailable interval.

18. An apparatus for wireless communications, comprising:
means for receiving a hybrid automatic repeat request (HARQ) data burst;
means for determining if a corresponding HARQ Acknowledgement (HARQ ACK) message for the HARQ data burst will occur in a scanning or an unavailable interval of a mobile station;
means for transmitting the HARQ ACK message during the scanning or the unavailable interval;
means for receiving a DL sub-frame containing the HARQ ACK message during the unavailable interval; and
means for processing the DL sub-frame after waking up from the unavailable interval.

19. An apparatus for wireless communications, comprising:
logic for monitoring a scanning or an unavailable interval of a mobile station (MS);
logic for determining if a hybrid automatic repeat request acknowledgement (HARQ ACK) message for a HARQ data burst will occur in the scanning or an unavailable interval of the MS; and
logic for postponing retransmission of the HARQ data burst by adjusting a time expected to receive the HARQ ACK message until after the scanning or the unavailable interval.

20. The apparatus of claim 19, wherein the HARQ data burst comprises an uplink (UL) HARQ data burst.

21. The apparatus of claim 19, wherein the HARQ data burst comprises a downlink (DL) HARQ data burst.

22. An apparatus for wireless communications, comprising:
logic for receiving a hybrid automatic repeat request (HARQ) data burst;
logic for determining if a corresponding HARQ Acknowledgement (HARQ ACK) message for the HARQ data burst will occur in a scanning or an unavailable interval of a mobile station;

logic for transmitting the HARQ ACK message during the scanning or the unavailable interval; and logic for storing a plurality of I-Q samples from a DL sub-frame containing the HARQ ACK message during the unavailable interval.

23. The apparatus of claim 22, wherein:

the logic for receiving the HARQ data burst comprises logic for receiving an uplink (UL) data burst; and the logic for transmitting the HARQ ACK message comprises logic for transmitting a downlink (DL) HARQ ACK message.

24. The apparatus of claim 22, wherein:

the logic for receiving the HARQ data burst comprises logic for receiving a downlink (DL) data burst; and the logic for transmitting the HARQ ACK message comprises logic for transmitting an uplink (UL) HARQ ACK message.

25. The apparatus of claim 22, further comprising:

logic for scanning one or more neighboring base stations by the mobile station during a frame immediately subsequent to a frame in which the HARQ ACK message was transmitted.

26. The apparatus of claim 22, further comprising:

logic for maintaining at least a portion of a radio frequency (RF) circuit powered on during at least part of the unavailable interval.

27. An apparatus for wireless communications, comprising:

logic for receiving a hybrid automatic repeat request (HARQ) data burst;

logic for determining if a corresponding HARQ Acknowledgement (HARQ ACK) message for the HARQ data burst will occur in a scanning or an unavailable interval of a mobile station;

logic for transmitting the HARQ ACK message during the scanning or the unavailable interval;

logic for receiving a DL sub-frame containing the HARQ ACK message during the unavailable interval; and logic for processing the DL sub-frame after waking up from the unavailable interval.

28. A computer-program product for wireless communications, comprising a non-transitory computer readable medium having instructions stored thereon, the instructions being executable by one or more processors and the instructions comprising:

instructions for monitoring a scanning or an unavailable interval of a mobile station (MS);

instructions for determining if a hybrid automatic repeat request acknowledgement (HARQ ACK) message for a HARQ data burst will occur in the scanning or an unavailable interval of the MS; and instructions for postponing retransmission of the HARQ data burst by adjusting a time expected to receive the HARQ ACK message until after the scanning or the unavailable interval.

29. The computer-program product of claim 28, wherein the HARQ data burst comprises an uplink (UL) HARQ data burst.

30. The computer-program product of claim 28, wherein the HARQ data burst comprises a downlink (DL) HARQ data burst.

31. A computer-program product for wireless communications, comprising a non-transitory computer readable medium having instructions stored thereon, the instructions being executable by one or more processors and the instructions comprising:

instructions for receiving a hybrid automatic repeat request (HARQ) data burst;

instructions for determining if a corresponding HARQ Acknowledgement (HARQ ACK) message for the HARQ data burst will occur in a scanning or an unavailable interval of a mobile station;

instructions for transmitting the HARQ ACK message during the scanning or the unavailable interval; and instructions for storing a plurality of I-Q samples from a DL sub-frame containing the HARQ ACK message during the unavailable interval.

32. The computer-program product of claim 31, wherein:

the instructions for receiving the HARQ data burst comprise instructions for receiving an uplink (UL) data burst; and the instructions for transmitting the HARQ ACK message comprise instructions for transmitting a downlink (DL) HARQ ACK message.

33. The computer-program product of claim 31, wherein:

the instructions for receiving the HARQ data burst comprise instructions for receiving a downlink (DL) data burst; and the instructions for transmitting the HARQ ACK message comprise instructions for transmitting an uplink (UL) HARQ ACK message.

34. The computer-program product of claim 31, further comprising:

instructions for scanning one or more neighboring base stations by the mobile station during a frame immediately subsequent to a frame in which the HARQ ACK message was transmitted.

35. The computer-program product of claim 31, further comprising:

instructions for maintaining at least a portion of a radio frequency (RF) circuit powered on during at least part of the unavailable interval.

36. A computer-program product for wireless communications, comprising a non-transitory computer readable medium having instructions stored thereon, the instructions being executable by one or more processors and the instructions comprising:

instructions for receiving a hybrid automatic repeat request (HARQ) data burst;

instructions for determining if a corresponding HARQ Acknowledgement (HARQ ACK) message for the HARQ data burst will occur in a scanning or an unavailable interval of a mobile station;

instructions for transmitting the HARQ ACK message during the scanning or the unavailable interval;

instructions for receiving a DL sub-frame containing the HARQ ACK message during the unavailable interval; and instructions for processing the DL sub-frame after waking up from the unavailable interval.

* * * * *